No. 738,027. Patented September 1, 1903.

UNITED STATES PATENT OFFICE.

RICHARD GLEY, OF BERLIN, GERMANY, ASSIGNOR TO ACTIEN GESELL-SCHAFT FÜR ANILIN FABRIKATION, OF BERLIN, GERMANY.

YELLOW SULFUR DYE AND PROCESS OF MAKING SAME.

SPECIFICATION forming part of Letters Patent No. 738,027, dated September 1, 1903.

Application filed April 20, 1903. Serial No. 153,351. (No specimens.)

*To all whom it may concern:*

Be it known that I, RICHARD GLEY, of Berlin, in the Kingdom of Prussia, German Empire, have invented new and useful Improvements in Yellow Sulfur Dyes and Processes of Making Same; and I do hereby declare that the following is a full, clear, and exact description thereof, which will enable others skilled in the art to which it appertains to make and use the same.

My invention relates to the manufacture of new yellow sulfur coloring-matters which are obtained by melting a nitrodiacetylamido compound of the benzene series with sulfur at higher temperatures in a suitable manner with addition of heavy volatile aromatic amins, which alone by melting with sulfur cannot be transformed into sulfur dyes. The substances thus prepared may after being well pulverized be directly employed in industry. They dye cotton very clear yellow shades of remarkable fastness to washing and light.

The above-mentioned nitrodiacetyl compounds of the benzene series which have been employed by me are, for instance, nitrodiacetyl-para-phenylenediamin, (Biedermann, *Berichte der Deutschen Chemischen Gesellschaft* VII, 1533,) nitrodiacetyl-meta-phenylenediamin, (Barbaglia, *Berichte* VII, 1258,) nitrodiacetyl-meta-toluylenediamin, (Tiemann, *Berichte* III, 9,) and nitrodiacetyl-orthophenylenediamin, (Ladenburg, *Berichte* XVII, 150.)

I give the following example to explain the manner of carrying my invention into practical effect without confining myself to the proportions given therein: mix five parts of sulfur with one part of the above-mentioned nitrodiacetyl-para-phenylenediamin and one part of benzidin and heat this mixture, while stirring, to 230° to 240° centigrade. Keep this temperature till the development of sulfurous acid and of sulfureted hydrogen has ceased, which ordinarily lasts three to four hours. The crude melt after being cooled is most finely pulverized and forms then a yellow-brown powder, which is soluble in a hot solution of sodium sulfid and also in hot caustic-soda lye. These solutions dye cotton clear yellow shades of great fastness, which is yet increased by a subsequent treatment with copper and chrome salts. The coloring-matter is soluble in sulfuric acid with a brown color.

In the foregoing example the nitrodiacetyl-para-phenylenediamin may be replaced by the above-said substances and the benzidin by alpha-naphthylamin or analogous high-boiling aromatic amins, which are not capable of yielding sulfur dyes if melted alone with sulfur.

Having now described my invention and in what manner it is to be performed, what I claim is—

1. The process of producing yellow sulfur dyestuffs by melting nitrodiacetylamido compounds of the benzene series with sulfur and heavy volatile aromatic amins, which are not capable of yielding sulfur dyestuffs if melted alone with sulfur, substantially as described.

2. As new products the yellow sulfur dyestuffs, obtained as described, which form yellow-brown powders, soluble in concentrated sulfuric acid with brown color, also in a hot solution of sodium sulfid with yellow color and which dye yellow shades on cotton in this solution.

In witness whereof I have hereunto signed my name this 6th day of April, 1903, in the presence of two subscribing witnesses.

RICHARD GLEY.

Witnesses:
WOLDEMAR HAUPT,
HENRY HASPER.